(12) United States Patent
Wojno et al.

(10) Patent No.: US 8,221,071 B2
(45) Date of Patent: Jul. 17, 2012

(54) INTEGRATED GUIDE VANE ASSEMBLY

(75) Inventors: John P. Wojno, Cincinnati, OH (US); Ian Francis Prentice, Cincinnati, OH (US); Manampathy Giridharan, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 922 days.

(21) Appl. No.: 12/241,842

(22) Filed: Sep. 30, 2008

(65) Prior Publication Data

US 2010/0080697 A1   Apr. 1, 2010

(51) Int. Cl.
*F03B 1/00* (2006.01)
*F03B 11/02* (2006.01)
*F03D 5/00* (2006.01)

(52) U.S. Cl. .................................. 415/208.1

(58) Field of Classification Search ............ 415/144, 415/208.1, 209.4, 192, 194; 416/231 B, 416/232, 235; 60/226.1, 796, 797
See application file for complete search history.

(56) References Cited

U.S. PATENT DOCUMENTS

| 6,195,983 B1 | 3/2001 | Wadia et al. |
| 2007/0084218 A1* | 4/2007 | Udall ............................ 60/796 |
| 2008/0159851 A1 | 7/2008 | Moniz et al. |

* cited by examiner

*Primary Examiner* — Benny Lee
*Assistant Examiner* — Gerald Stevens
(74) *Attorney, Agent, or Firm* — General Electric Company; William Scott Andes; David J. Clement

(57) ABSTRACT

An integrated outlet guide vane assembly for turbomachinery typically includes at least one outlet guide vane and at least one bifurcation having a leading edge and a trailing edge. The turbomachinery has a central axis of rotation and a defined direction of rotation about the axis. The guide vane comprises an airfoil having a leading edge and a trailing edge and has a non-zero angle of lean in the direction of rotation and a non-zero sweep angle relative to a line perpendicular to the central axis. The leading edge of the bifurcation has a non-zero angle of lean in the direction of rotation and a non-zero sweep angle relative to a line perpendicular to the central axis. The trailing edge of the vane is faired into the leading edge of the bifurcation.

10 Claims, 7 Drawing Sheets

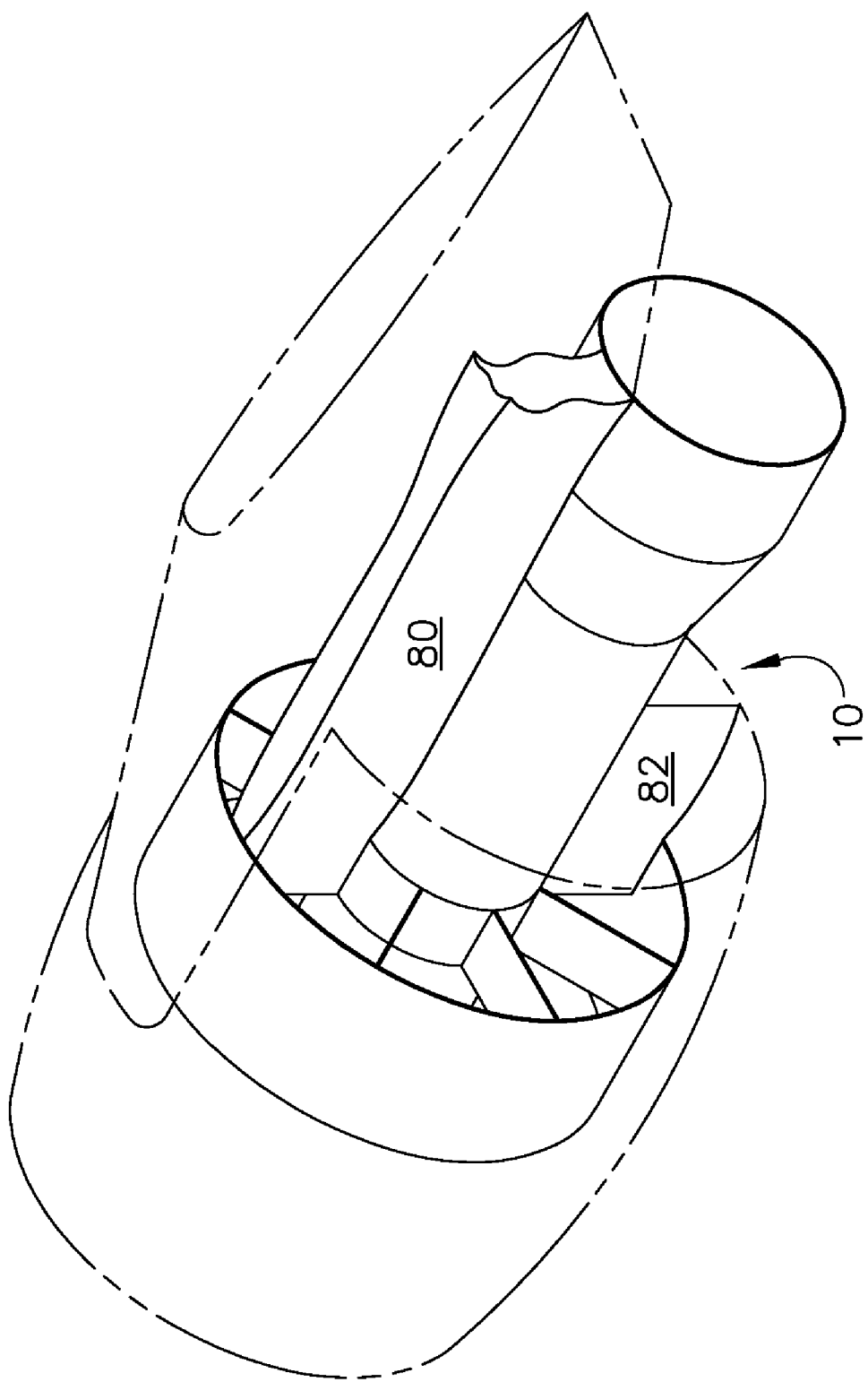

INTEGRATED GUIDE VANE ASSEMBLY

BACKGROUND OF THE INVENTION

The technology described herein relates generally to turbomachinery, particularly to gas turbine engines, and more particularly, to a gas turbine engine guide vane assembly.

At least one known gas turbine engine assembly includes a fan assembly that is mounted upstream from a core gas turbine engine. During operation, a portion of the airflow discharged from the fan assembly is channeled downstream to the core gas turbine engine wherein the airflow is further compressed. The compressed airflow is then channeled into a combustor, mixed with fuel, and ignited to generate hot combustion gases. The combustion gases are then channeled to a turbine, which extracts energy from the combustion gases for powering the compressor, as well as producing useful work to propel an aircraft in flight. The other portion of the airflow discharged from the fan assembly exits the engine through a fan stream nozzle.

To facilitate channeling the airflow from the fan assembly to the fan stream exhaust, at least one known gas turbine engine assembly includes an outlet guide vane assembly that is used to remove swirl before the fan nozzle. Such an outlet guide vane assembly is configured to turn the airflow discharged from the fan assembly to a substantially axial direction prior to the fan flow being exhausted from the bypass duct. In addition to turning the fan airflow, the outlet guide vane assembly also provides structural stiffness to the fan frame. More specifically, outlet guide vane assemblies generally include a plurality of outlet guide vanes that are coupled to the fan frame.

In addition to outlet guide vanes, many fan frame assemblies include one or more (frequently two, diametrically opposed) dividing structures, often called "bifurcations", which divide the annular space defined by the bypass duct into two semi-annular spaces. These dividing structures are typically hollow duct-like structures through which various mechanical, electrical, pneumatic, hydraulic, or other connections (including structural supports) can pass without causing disruption to the airflow through the bypass duct. The bifurcations "fair" or guide the flow in aerodynamic fashion around these structures, and may be integrated or blended into the profile of an upstream guide vane to reduce the number of individual airflow disruptions.

Geometric sweep and lean characteristics for guide vanes have been previously demonstrated to be useful design parameters for reducing noise caused by aerodynamic interactions between guide vanes and upstream and/or downstream rotating elements such as fan blades. However, since bifurcations are typically radially oriented there remains a need for an improved approach to integrating advanced design swept and/or leaned guide vanes with bypass duct bifurcations.

BRIEF SUMMARY OF THE INVENTION

In one aspect, an integrated outlet guide vane assembly for turbomachinery typically includes at least one outlet guide vane and at least one bifurcation having a leading edge and a trailing edge. The turbomachinery has a central axis of rotation and a defined direction of rotation about the axis. The guide vane comprises an airfoil having a leading edge and a trailing edge and has a non-zero angle of lean in the direction of rotation and a non-zero sweep angle relative to a line perpendicular to the central axis. The leading edge of the bifurcation has a non-zero angle of lean in the direction of rotation and a non-zero sweep angle relative to a line perpendicular to the central axis. The trailing edge of the vane is faired into the leading edge of the bifurcation.

BRIEF DESCRIPTION OF THE DRAWINGS

FIG. 9 is a perspective view of the gas turbine engine of FIG. 8 in a typical installation configuration for an aircraft (not shown).

DETAILED DESCRIPTION OF THE INVENTION

Figure 1:
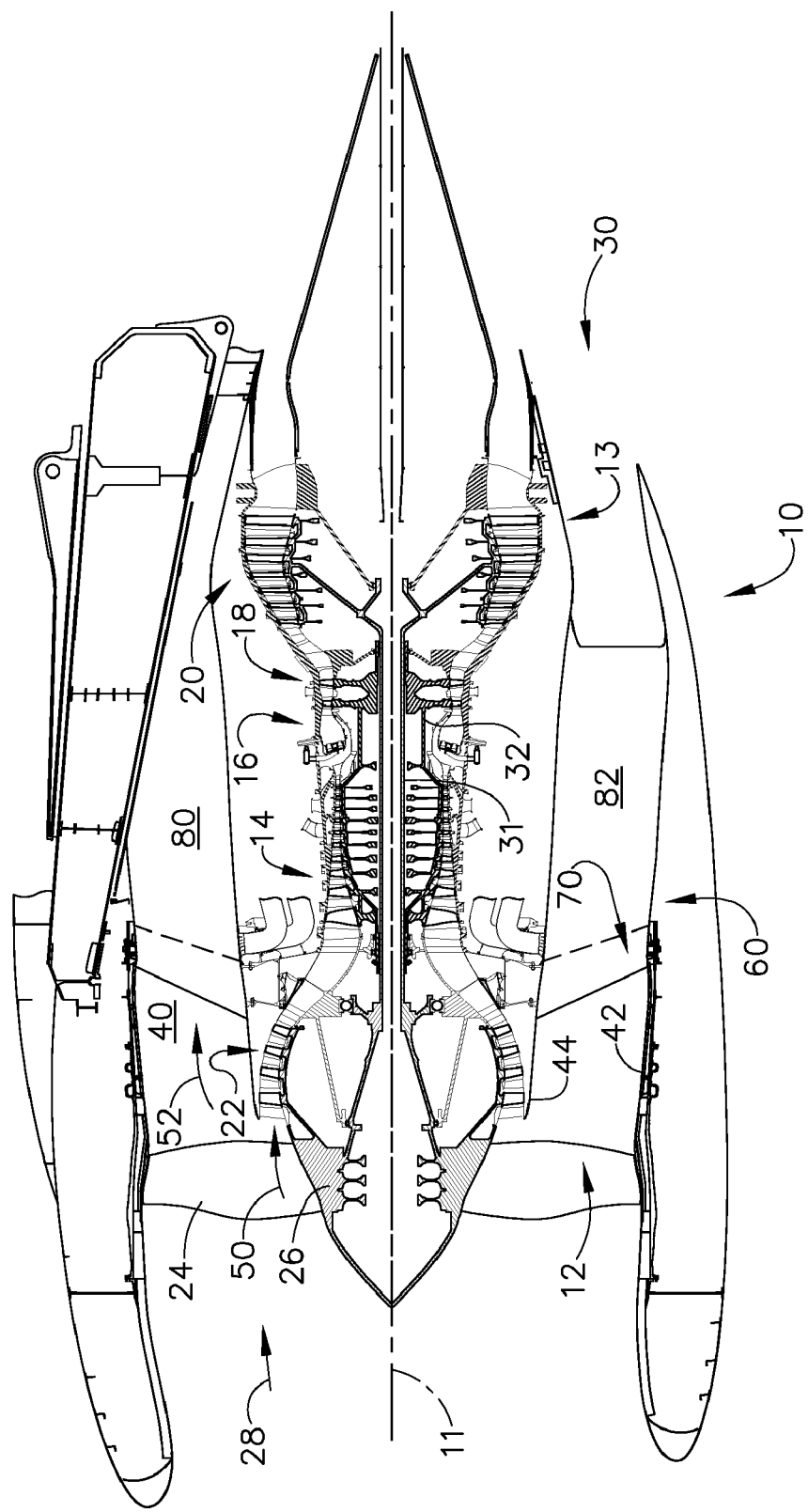
FIG. 1 is a cross-sectional illustration of an exemplary gas turbine engine assembly.

FIG. 1 is a cross-sectional schematic illustration of an exemplary gas turbine engine assembly 10 having a longitudinal axis 11. Gas turbine engine assembly 10 includes a fan assembly 12 and a core gas turbine engine 13. Core gas turbine engine 13 includes a high pressure compressor 14, a combustor 16, and a high pressure turbine 18. In the exemplary embodiment, gas turbine engine assembly 10 also includes a low pressure turbine 20, and a multi-stage booster compressor 22, and a splitter 44 that substantially circumscribes booster 22.

Fan assembly 12 includes an array of fan blades 24 extending radially outward from a rotor disk 26. Gas turbine engine assembly 10 has an intake side 28 and an exhaust side 30. Fan assembly 12, booster 22, and turbine 20 are coupled together by a first rotor shaft 31, and compressor 14 and turbine 18 are coupled together by a second rotor shaft 32.

In operation, air flows through fan assembly 12 and a first portion 50 of the airflow is channeled through booster 22. The compressed air that is discharged from booster 22 is channeled through compressor 14 wherein the airflow is further compressed and delivered to combustor 16. Hot products of combustion (not shown in FIG. 1) from combustor 16 are utilized to drive turbines 18 and 20, and turbine 20 is utilized to drive fan assembly 12 and booster 22 by way of shaft 31. Gas turbine engine assembly 10 is operable at a range of operating conditions between design operating conditions and off-design operating conditions.

A second portion 52 of the airflow discharged from fan assembly 12 is channeled through a bypass duct 40 to bypass a portion of the airflow from fan assembly 12 around the core gas turbine engine 13. More specifically, bypass duct 40 extends between a fan casing or shroud 42 and splitter 44. Accordingly, a first portion 50 of the airflow from fan assembly 12 is channeled through booster 22 and then into compressor 14 as described above, and a second portion 52 of the airflow from fan assembly 12 is channeled through bypass duct 40 to provide thrust for an aircraft, for example. Gas turbine engine assembly 10 also includes a fan frame assembly 60 to provide structural support for fan assembly 12 and is also utilized to couple fan assembly 12 to core gas turbine engine 13.

Fan frame assembly 60 includes a plurality of outlet guide vanes 70 that typically extend substantially radially, between a radially-outer mounting flange and a radially-inner mounting flange, and are circumferentially-spaced within bypass duct 40. Fan frame assembly 60 may also include a plurality of struts that are coupled between a radially outer mounting flange and a radially inner mounting flange. In one embodiment, fan frame assembly 60 is fabricated in arcuate segments in which flanges are coupled to outlet guide vanes 70 and struts. In one embodiment, outlet guide vanes and struts are coupled coaxially within bypass duct 40. Optionally, outlet guide vanes 70 may be coupled upstream or downstream from struts within bypass duct 40. Guide vanes 70 serve to turn the airflow downstream from rotating blades such as fan blades 24.

Fan frame assembly 60 is one of various frame and support assemblies of gas turbine engine assembly 10 that are used to facilitate maintaining an orientation of various components within gas turbine engine assembly 10. More specifically, such frame and support assemblies interconnect stationary components and provide rotor bearing supports. Fan frame assembly 60 is coupled downstream from fan assembly 12 within bypass duct 40 such that outlet guide vanes 70 and struts are circumferentially-spaced around the outlet of fan assembly 12 and extend across the airflow path discharged from fan assembly 12.

FIG. 1 also illustrates the bifurcations 80 and 82 which extend radially through the bypass duct 40 between the fan casing or shroud 42 and splitter 44. The configuration of bifurcations 80 and 82 will be described in greater detail hereafter. While the figures herein illustrate two (upper and lower) bifurcations, it is possible that for certain configurations (including certain engine mounting arrangements) that either a single bifurcation or three or more bifurcations may be utilized.

Figure 2:
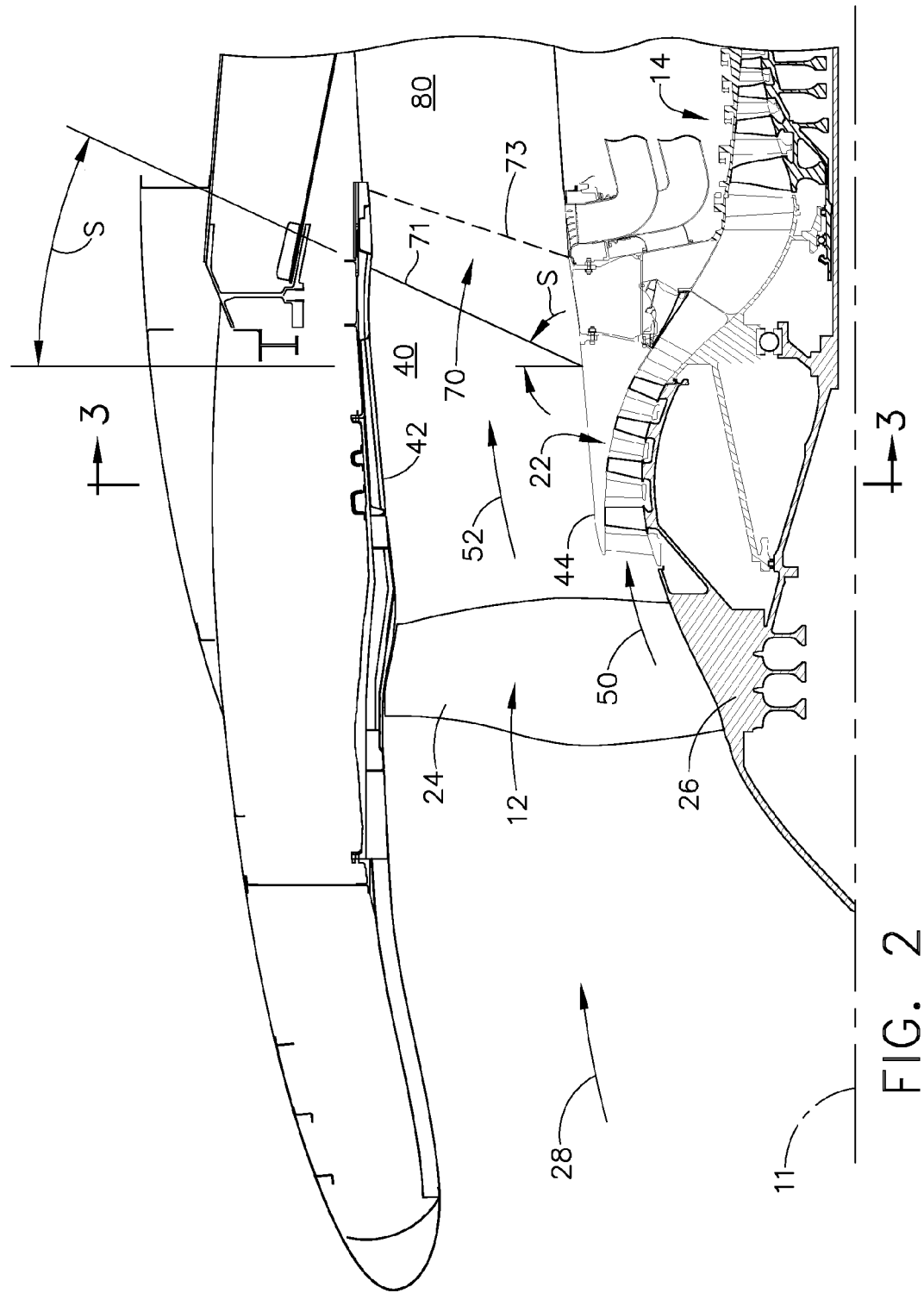
FIG. 2 is an elevational partial cross-sectional view of the gas turbine engine assembly shown in FIG. 1.
Figure 3:
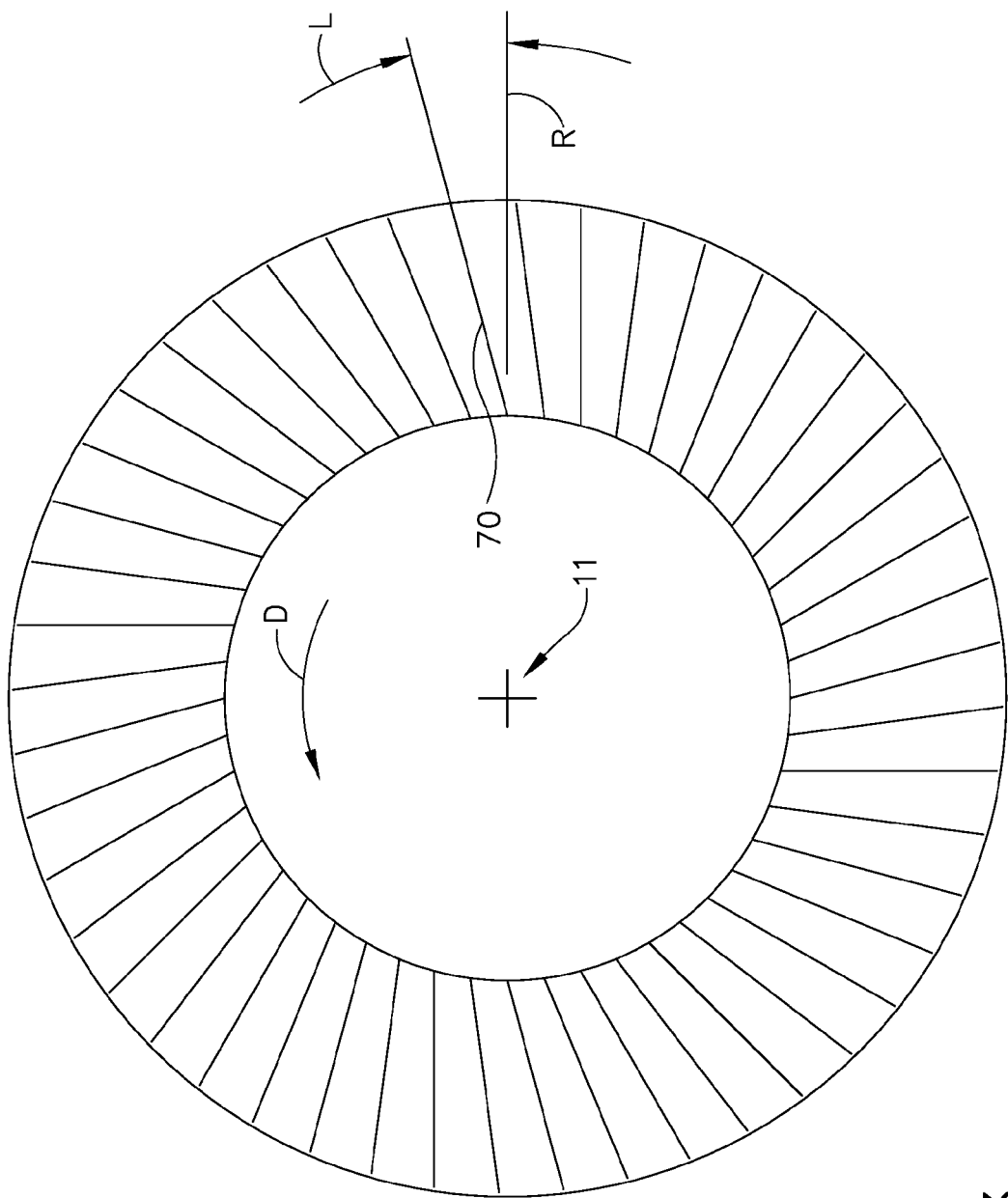
FIG. 3 is an elevational view of the guide vane assembly shown in FIG. 2 taken along line 3-3.

FIG. 2 is an enlarged elevational cross-sectional view of the gas turbine engine 10 of FIG. 1, showing the elements of FIG. 1 in greater detail as well as illustrating the location at which the sectional elevational view of FIG. 3 is taken along lines 3-3.

FIG. 3 is an elevational view which illustrates, looking rearward from the front of the gas turbine engine, the relationship of the vanes 70 to the reference lines and axes of the gas turbine engine 10. As shown in FIG. 3, the guide vanes 70 are circumferentially distributed around the central axis 11 of the gas turbine engine 10. FIG. 3 illustrates the direction of rotation D of the gas turbine engine during normal operation, the radial direction R, and the lean angle L which leaned typical guide vanes 70 make with respect to the radial direction R. In the embodiment shown, the lean angle L shown in the direction of fan rotation, which provides maximum acoustic benefit.

Figure 4:
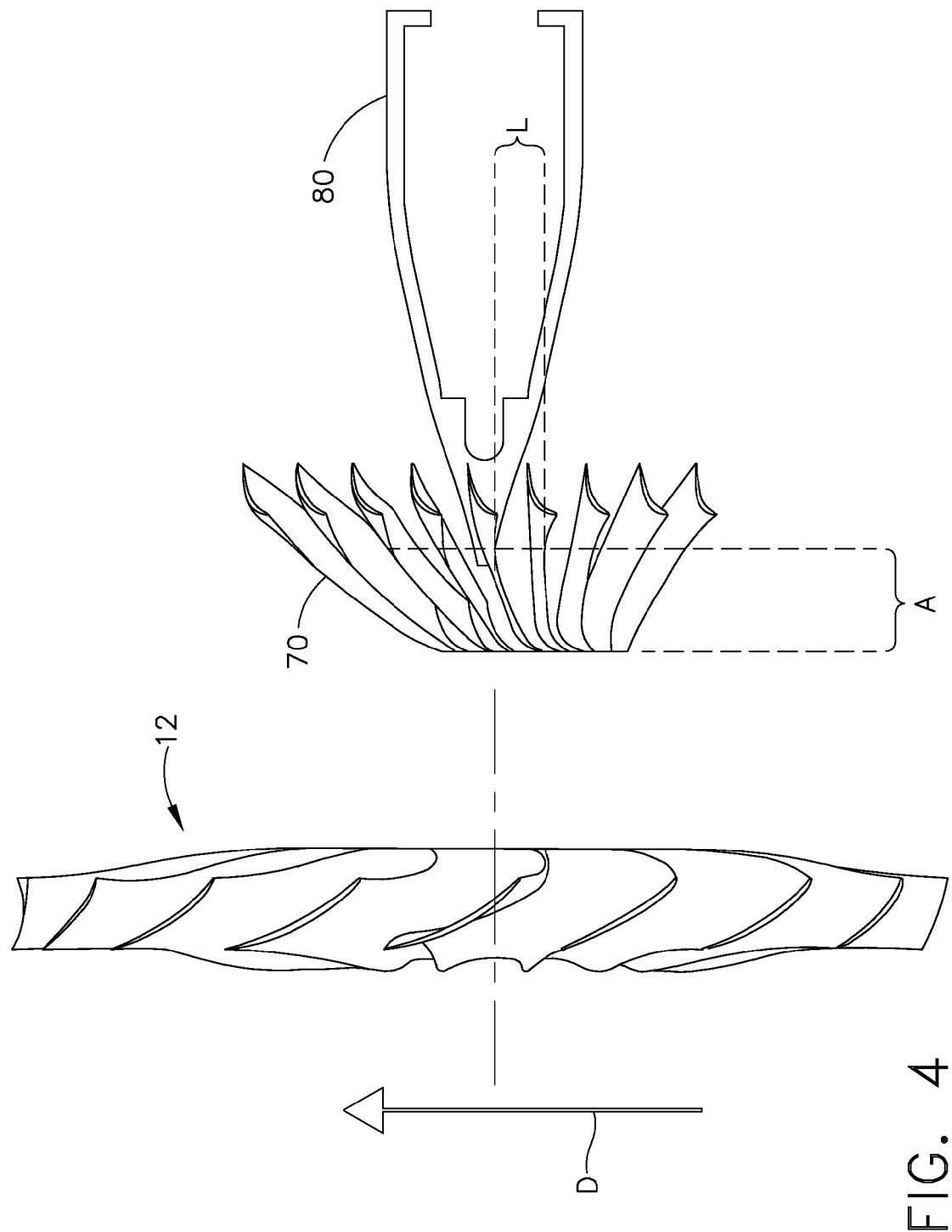
FIG. 4 is an illustration of the relationship in plan view between the fan assembly, guide vane assembly, and bifurcation shown in FIG. 1.

FIG. 4 is a plan view looking downward on elements of the gas turbine engine 10 to illustrate the relationship between the fan assembly 12, guide vanes 70, and bifurcation 80. In this illustration, the guide vanes 70 incorporate lean in the direction of rotation, and a sweep angle toward the rear of the engine from their inner end (root) 72 to their outer end (tip) 74.

As shown in FIG. 4, the bifurcation 80 is a hollow duct-like structure through which various mechanical, electrical, pneumatic, hydraulic, or other connections (including structural supports) can pass without causing disruption to the airflow through the bypass duct 40. In a typical installation of the gas turbine engine 10 under the wing of an aircraft (not shown), the upper bifurcation houses the engine mounts and various electrical, hydraulic, and pneumatic systems while the lower bifurcation houses oil drains and the like. The bifurcations "fair" or guide the flow in aerodynamic fashion around these structures. As will become apparent with respect to FIGS. 5-7, the forward edge of the bifurcation 80 is leaned and/or swept to meet with and blend into the trailing edge 73 of the guide vane 70. The remaining portion of the bifurcation, aft of the leading edge portion, may be similarly leaned or may be more radially oriented as needed to accommodate structural loads and the passage of the various service connections.

Figure 5:
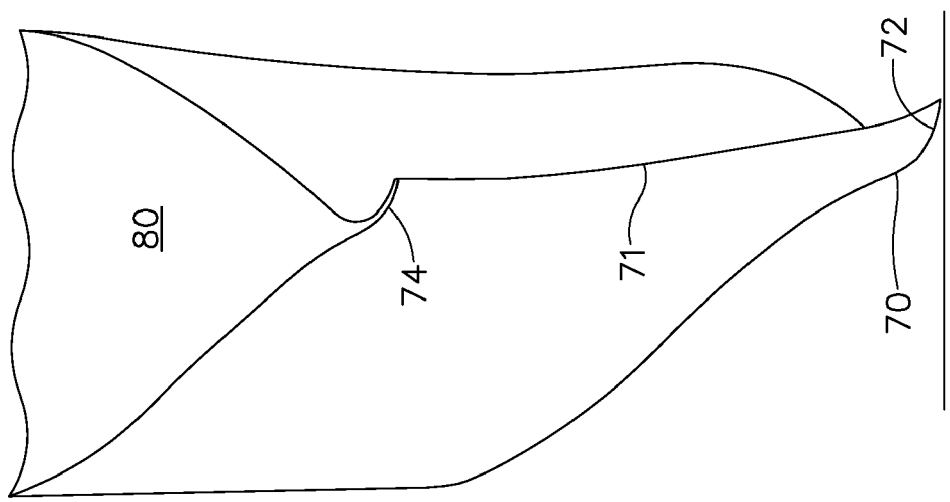

FIG. 5 shows the aerodynamic integration of the guide vane 70, and particularly the trailing edge of the guide vane 70, into the leading edge of the bifurcation 80. This is an important aspect of implementing the swept and leaned guide vane designs into the integral vane frame engine architecture.

Lean and/or sweep of the guide vanes and bifurcations may provide aerodynamic, acoustic, and/or other benefits in terms of gas turbine engine performance. Angles of sweep S such as about 0 to about 40 degrees aft, relative to the hub radial direction (normal to the central axis), and/or circumferentially leaning the outlet guide vane 70 with lean angles L from about −40 to about 0 degrees, relative to the radial orientation, in the direction of fan rotation, may provide acoustic benefits, such as reductions in noise from the fan assembly 12. Angles of sweep greater than about 5 degrees aft, and angles of lean greater than about −5 degrees, are believed to be particularly useful. Negative angles of sweep, i.e., forward sweep, is also possible for some applications in comparable angular ranges of about −40 to about 0 degrees forward. Positive lean angles are also possible, in comparable angular ranges of about 0 to about 40 degrees. For the sake of illustration, the drawing figures depict configurations employing a lean angle of about −10 degrees and a sweep angle of about 25 degrees.

Figure 7:
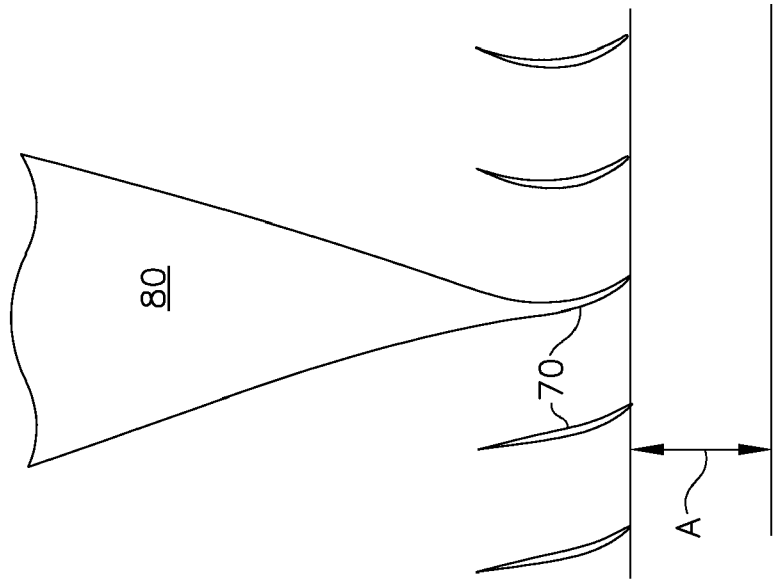
FIGS. 5, 6, and 7 illustrate the relationship between guide vanes and the leading edge of the bifurcation shown in FIG. 1.
Figure 6:
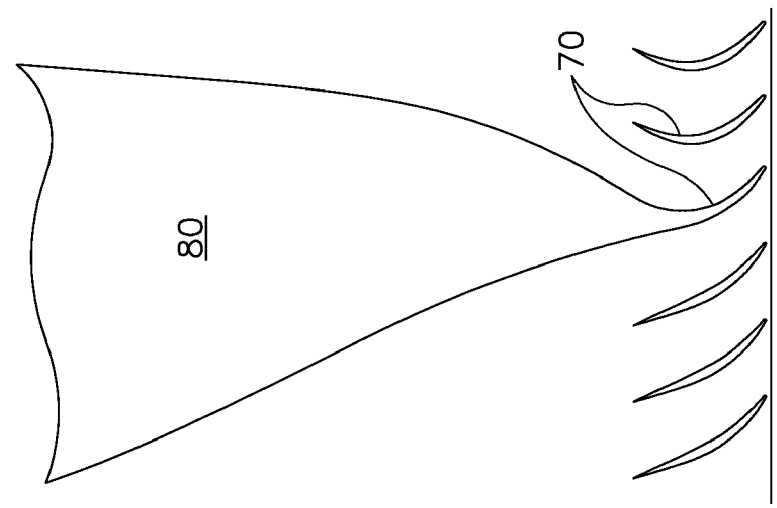

Because of the sweep incorporated into the geometry of guide vane 70, the axial location of the vane leading edge 71 varies with radial station. Aerodynamic and acoustic optimization also requires different vane turning angles at each radial station. FIGS. 6 and 7 illustrate the extremes of these differences, at the vane root 72 and tip 74 locations, respectively. Comparison of these figures also illustrates increased axial fan/vane spacing at the vane tip 74, due to the swept design in a positive (rearward) sweep configuration, which provides acoustic benefit. FIGS. 4 and 7 depict the axial component of vane sweep, from root to tip, as the distance A.

Figure 8:
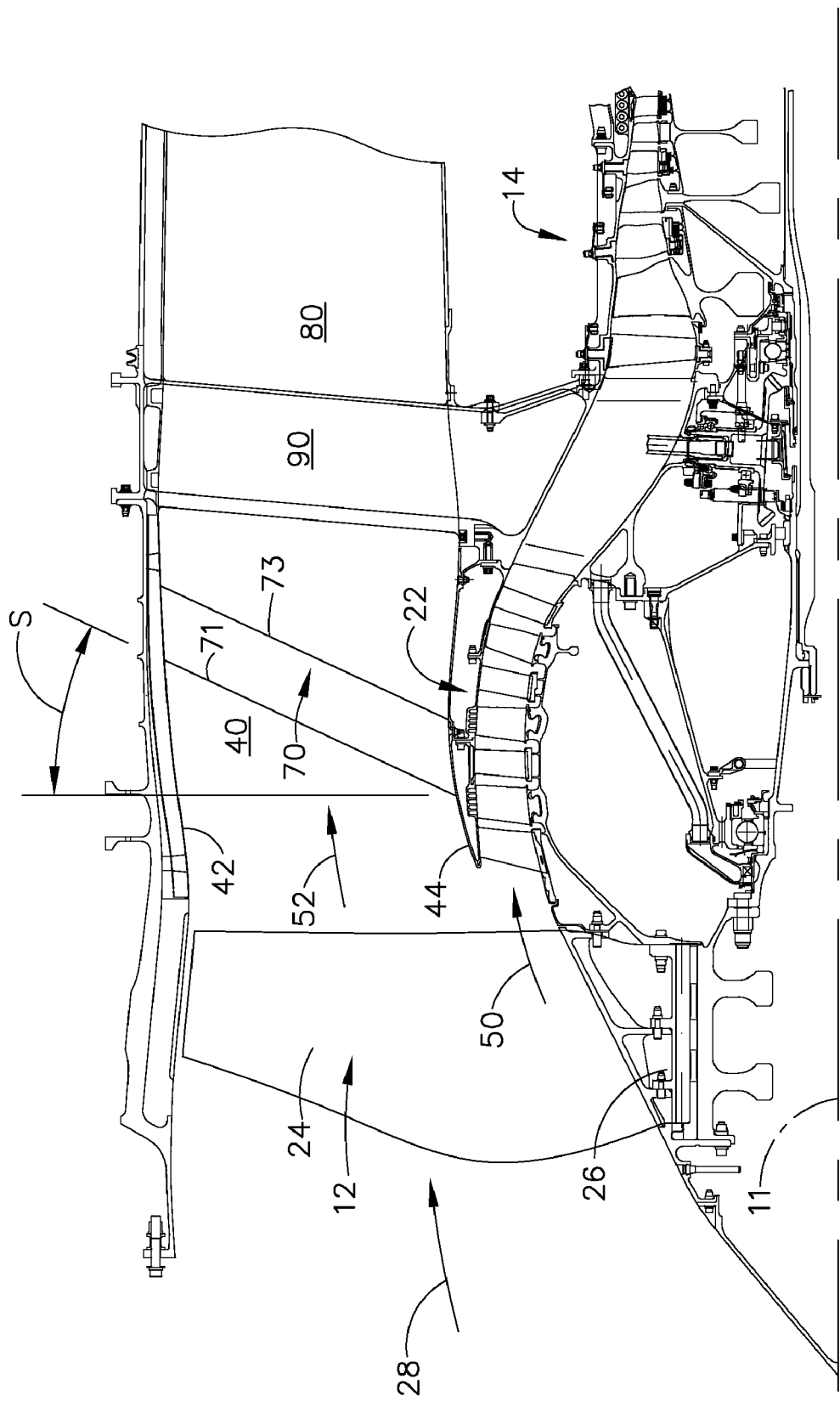
FIG. 8 is an elevational partial cross-sectional view similar to FIG. 2 of another embodiment of the gas turbine engine assembly shown in FIG. 1.

FIG. 8 is an elevational partial cross-sectional view similar to FIG. 2 of another embodiment of the gas turbine engine assembly shown in FIG. 1. In FIG. 8, the same numbering scheme for individual elements described above with respect to FIG. 2 is employed. The configuration of FIG. 8 differs from that of FIG. 2 in that the fan frame assembly 60 includes guide vanes 70 along with a smaller number (such as, for example, 6) structural strut members 90 spaced annularly around the bypass duct and a bifurcation 80. In such a configuration, the strut members 90 are load-bearing elements which reduce the structural loads imparted to the guide vanes 70. As previously described above, the strut members are incorporated into the bifurcation(s) and the guide vane(s) adjacent to the bifurcation(s) are blended or faired in such that the trailing edge of the guide vane and the leading edge of the respective bifurcation are blended together. FIG. 9 is a perspective view of the gas turbine engine of FIG. 8 in a typical installation configuration for an aircraft (not shown).

The guide vanes and bifurcations may be fabricated from any suitable materials using any suitable fabrication methods as are known in the art and suitable for the intended configuration and operating environment. Configuration details, such as the number and thickness of guide vanes 70, may influence the degree to which lean and sweep can be implemented without interfering with adjacent vanes.

While much of the discussion has focused on an aviation gas turbine engine as the context for integration of the guide vane and bifurcation, it is foreseeable that such geometries and integrations may be suitable for use in other environments wherein a stationary guide vane and bifurcation are located downstream from rotating turbomachinery, such as wind or steam turbines.

While the invention has been described in terms of various specific embodiments, those skilled in the art will recognize that the invention can be practiced with modification within the spirit and scope of the claims.

What is claimed is:

1. An integrated outlet guide vane assembly for turbomachinery, said turbomachinery having a central axis of rotation and a defined direction of rotation about said central axis, said integrated outlet guide vane assembly comprising:
    at least one outlet guide vane, said at least one outlet guide vane comprising an airfoil having a leading edge and a trailing edge, said at least one outlet guide vane further having a non-zero angle of lean in said direction of rotation and a non-zero sweep angle relative to a line perpendicular to said central axis; and
    at least one bifurcation, said at least one bifurcation having a leading edge and a trailing edge and forming a hollow duct-like structure through which various connections of the turbomachinery can pass without causing disruption to airflow, said leading edge of said at least one bifurcation having a non-zero angle of lean in said direction of rotation and a non-zero sweep angle relative to a line perpendicular to said central axis;
    wherein said trailing edge of said at least one outlet guide vane is faired into said leading edge of said at least one bifurcation.

2. An integrated outlet guide vane assembly in accordance with claim 1, wherein said lean angle of said at least one bifurcation is negative.

3. An integrated outlet guide vane assembly in accordance with claim 1, wherein said sweep angle of said at least one bifurcation is positive.

4. An integrated outlet guide vane assembly in accordance with claim 1, wherein said lean angle of said at least one bifurcation is greater than about −5 degrees and said sweep angle of said at least one bifurcation is greater than about 5 degrees.

5. An integrated outlet guide vane assembly in accordance with claim 1, wherein said at least one outlet guide vane includes at least two outlet guide vanes and said at least one bifurcation includes at least two bifurcations, wherein said at least two outlet guide vanes and said at least two bifurcations are faired together.

6. An integrated outlet guide vane assembly in accordance with claim 1, wherein said at least one bifurcation is a hollow structure.

7. An integrated outlet guide vane assembly in accordance with claim 1, wherein said lean angle of said at least one bifurcation is about −10 degrees and said sweep angle of said at least one bifurcation is about 25 degrees.

8. An integrated outlet guide vane assembly in accordance with claim 1, wherein said bifurcation located aft of said leading edge of said at least one bifurcation is generally radially oriented.

9. An integrated guide vane assembly for turbomachinery, said turbomachinery having a central axis of rotation and a defined direction of rotation about said central axis, said integrated outlet guide vane assembly comprising:
    at least one outlet guide vane, said at least one outlet guide vane comprising an airfoil having a leading edge and a trailing edge, said at least one outlet guide vane further having a non-zero angle of lean in said direction of rotation and a non-zero sweep angle relative to a line perpendicular to said central axis;
    at least one bifurcation, said at least one bifurcation having a leading edge and a trailing edge, said leading edge of said at least one bifurcation having a non-zero angle of lean in said direction of rotation and a non-zero sweep angle relative to a line perpendicular to said central axis; and
    at least one strut member located between said at least one outlet guide vane and said at least one bifurcation;
    wherein said trailing edge of said at least one outlet guide vane is faired into said leading edge of said at least one bifurcation.

10. A gas turbine engine, said gas turbine engine having a central axis of rotation and a defined direction of rotation about said central axis, said gas turbine engine comprising:
    a core gas turbine engine;
    a fan assembly disposed upstream from said core gas turbine engine, said fan assembly comprising a plurality of fan blades; and
    an integrated outlet guide vane assembly disposed downstream from said fan blades, said integrated outlet guide vane assembly comprising:
    at least one outlet guide vane, said at least one outlet guide vane comprising an airfoil having a leading edge and a trailing edge, said at least one outlet guide vane further having a non-zero angle of lean in said direction of rotation and a non-zero sweep angle relative to a line perpendicular to said central axis; and
    at least one bifurcation, said at least one bifurcation having a leading edge and a trailing edge and forming a hollow duct-like structure through which various connections of the gas turbine engine can pass without causing disruption to airflow, said leading edge of said at least one bifurcation having a non-zero angle of lean in said direction of rotation and a non-zero sweep angle relative to a line perpendicular to said central axis;
    wherein said trailing edge of said at least one outlet guide vane is faired into said leading edge of said at least one bifurcation.

* * * * *